US012753739B2

(12) United States Patent
Jöckel et al.

(10) Patent No.: US 12,753,739 B2
(45) Date of Patent: Oct. 6, 2026

(54) METHOD OF MOUNTING A SEGMENTED GENERATOR OF A WIND TURBINE, GENERATOR SEGMENT, SEGMENTED GENERATOR AND WIND TURBINE

(71) Applicant: Wobben Properties GmbH, Aurich (DE)

(72) Inventors: Stephan Jöckel, Kleinniedesheim (DE); Alexander Philipp, Reilingen (DE); Klaas Schumann, Hage (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 29 days.

(21) Appl. No.: 19/070,256

(22) Filed: Mar. 4, 2025

(65) Prior Publication Data

US 2025/0277482 A1 Sep. 4, 2025

(30) Foreign Application Priority Data

Mar. 4, 2024 (EP) .................................... 24161056

(51) Int. Cl.
*F03D 13/00* (2016.01)
*F03D 13/10* (2016.01)

(52) U.S. Cl.
CPC ......... *F03D 13/122* (2023.08); *F03D 13/104* (2023.08); *F03D 13/139* (2023.08); *F05B 2230/61* (2013.01); *F05B 2260/31* (2020.08)

(58) Field of Classification Search
CPC .... F03D 13/122; F03D 13/104; F03D 13/139; F03D 9/25; F05B 2230/61; F05B 2260/31; Y02E 10/72; H02K 7/1838; H02K 15/60; H02K 15/90; H02K 2201/15; H02K 2213/12; H02K 1/148; H02K 15/02; H02K 1/12; H02K 1/22; H02K 5/16; H02K 16/00
See application file for complete search history.

(56) References Cited

U.S. PATENT DOCUMENTS

2010/0066096 A1 * 3/2010 Stiesdal .................... F03D 9/25
290/55

FOREIGN PATENT DOCUMENTS

EP 4016809 A1 6/2022

OTHER PUBLICATIONS

European Search Report; dated Sep. 3, 2024; application # 24161056.7.

* cited by examiner

*Primary Examiner* — Julio C. Gonzalez
(74) *Attorney, Agent, or Firm* — Polsinelli PC

(57) ABSTRACT

Aspects of the present disclosure are directed to methods for mounting a segmented generator of a wind turbine, wherein the segmented generator for the operation of the wind turbine is formed from two or more generator segments, wherein the generator segments each have a stator segment and a rotor segment, wherein the stator segment for fastening the stator segment to a machine carrier flange of a machine carrier has a stator flange and the rotor segment for fastening to a rotor carrier of a main bearing has a rotor flange, wherein the two or more generator segments in the circumferential direction (U) each extend between two connection interfaces (V1, V2) which are formed for connection with connection interfaces (V1, V2) of generator segments arranged adjacent in the circumferential direction (U).

13 Claims, 12 Drawing Sheets

METHOD OF MOUNTING A SEGMENTED GENERATOR OF A WIND TURBINE, GENERATOR SEGMENT, SEGMENTED GENERATOR AND WIND TURBINE

CROSS-REFERENCE TO RELATED APPLICATIONS

This application claims the benefit of priority to European application number 24161056.7, filed on Mar. 4, 2024, which is expressly incorporated by reference herein in its entirety.

TECHNICAL FIELD

The present disclosure relates to a method for mounting a segmented generator of a wind turbine. The present disclosure also relates to a generator segment for a segmented generator of a wind turbine, a segmented generator for a wind turbine and a wind turbine.

BACKGROUND

For the mounting of a wind turbine, in particular a generator or generator segments of a segmented generator, the rotor blades, the hub and the nacelle, usually large load cranes are required. Their availability is on the one hand limited and on the other hand the use of such cranes is expensive.

SUMMARY

Aspects of the present disclosure are directed to providing a method for mounting a segmented generator of a wind turbine, a generator segment, a segmented generator and a wind turbine that is improved compared to the known solution. In particular, the present disclosure is directed to providing a method for mounting a segmented generator of a wind turbine, a generator segment, a segmented generator and a wind turbine that enables a more effortless mounting of the generator segment, the segmented generator and the wind turbine. In one aspect, the present disclosure provides a method for mounting a segmented generator of a wind turbine, a generator segment, a segmented generator and a wind turbine, which minimizes the required mounting time of wind turbines with such load cranes.

According to a first aspect of the present disclosure, a method according to claim 1 is provided for mounting a segmented generator of a wind turbine.

Such a segmented generator for operating a wind turbine is formed from two or more generator segments, wherein the generator segments each have a stator segment and a rotor segment. Hereby, it is provided that the stator segment for fastening the stator segment to a machine carrier flange of a machine carrier has a stator flange. The rotor segment for fastening to a rotor carrier of a main bearing has a rotor flange.

In one example, it is provided that the rotor segments can form a segmented rotor of the segmented generator and/or the stator segments can form a segmented stator of the segmented generator. In one example, the segmented rotor and the segmented stator are arranged coaxially to the axis of rotation of the generator. The segmented rotor can be fastened to the main bearing for operation in such a way that in operation it rotates around the axis of rotation of the segmented generator relative to the stationary segmented stator. For this purpose, a corresponding annular air gap is provided between the rotor and the stator during operation, which extends in the radial direction between the rotor and the stator.

In one example, the segmented rotor is positioned on the outside in relation to the axis of rotation of the segmented generator with respect to the segmented stator in the radial direction. Alternatively, it may be preferable for the segmented rotor to be arranged on the inside with respect to the axis of rotation of the segmented generator relative to the segmented stator in the radial direction. In this respect, the segmented generator can be formed as an internal rotor or as an external rotor.

It is provided that the two or more generator segments each extend in the circumferential direction between two connection interfaces, which are formed for connecting with connection interfaces of generator segments arranged adjacent in the circumferential direction. In one example, the connection interfaces have at least flanges in sections, which are formed for connecting adjacent generator segments. In one example, the connection interfaces are formed for a force-fit and/or form-fit connection of adjacent generator segments.

In one example, the connection interfaces have corresponding protrusions and/or recesses for a positive connection of adjacent generator segments, wherein for each protrusion a corresponding recess is formed. In one example, the connection interfaces have centering bolts and/or centering pins and corresponding receptacles or openings for the centering bolts and/or centering pins. In one example, this minimizes the effort required to align an air gap of the segmented generator. In one example, the centering bolts and/or centering pins and the corresponding receptacles or openings for the centering bolts and/or centering pins allow the air gap to be aligned via the connection interfaces. This eliminates in one example the need for time-consuming alignment of the air gap with a main crane. A main crane is, in one example, a crane which is formed to carry the loads of the generator segments and/or the rotor blades and/or the main bearing and/or the hub and/or the machine carrier and to lift them at least to the hub height of a wind turbine.

Additionally or alternatively, it may be preferable that the connection interfaces each have a screw connection for a force-fit connection of adjacent generator segments. This screw connection can, for example, be formed from a threaded screw, which can be inserted through through-holes in corresponding (sectional) flanges of the connection interfaces and fastened with a screw nut. Furthermore, this screw connection can, for example, be formed from a threaded screw which is inserted through a through hole in a flange of a generator segment and screwed into an opening with an internal thread in a flange of an adjacent generator segment. In one example, the screw connection is provided for pre-fixing, for a minimal screw connection. Additionally or alternatively, the screw connection is provided for a maximal screw connection. In one example, a part of the screw connections is provided for the minimal screw connection and another part of the screw connections is provided for the maximal screw connection.

In one example, the connection interfaces are formed in such a way that no complex alignment of the air gap of the segmented generator is required for the operation of the wind turbine. In one example, the connection interfaces are formed in such a way that the air gap for the operation of the wind turbine is aligned via the connection interfaces. In one example, this eliminates the need for time-consuming alignment of the air gap with a main crane.

The corresponding generator segment or the corresponding rotor segment and/or the corresponding stator segment are, in one example, formed in the shape of a partial ring in relation to the axis of rotation in a circumferential direction. In one example, the generator segment or the rotor segment and/or the stator segment have a partially annular geometry. A generator segment or a rotor segment and/or a stator segment, which is correspondingly partially annular or has a partially annular geometry, extends in the circumferential direction with a certain degree of arc between the two connection interfaces.

In one example, the two or more generator segments or the two or more rotor segments and/or two or more stator segments extend with the same degree of arc in the circumferential direction. In one example, the generator segments or the rotor and/or stator segments extend depending on the number of the respective segments according to the following formula: 360°/(number of segments). Accordingly, for example, the generator segments of a segment generator consisting of two generator segments each extend by 180° in the circumferential direction, with three generator segments it would be 120°, with four generator segments 90°, and so on. This can apply accordingly to the rotor segments and/or stator segments. In one example, the segment generator is formed from two generator segments. In this example embodiment, the two generator segments each extend by 180° in the circumferential direction.

Any other extensions in the circumferential direction of the generator segments are conceivable, provided that when put together they result in an extension of 360° in the circumferential direction. The explanations regarding the generator segment can apply accordingly to a rotor segment of a segmented rotor and/or a stator segment of a segmented stator.

In one example, the first and second connection interface extend essentially orthogonally to the circumferential direction. In one example, the first and second connection interface define a first and second connection interface plane within which the axis of rotation extends. In one example, the first and/or second connection interface extend in such a way that the first and/or second connection interface plane extend in a radial direction with respect to the axis of rotation. In one example, the first and/or second connection interface plane extending in the radial direction with respect to the axis of rotation intersect in an axis which is or defines the axis of rotation. In one example, the axis of rotation lies in the first and/or second connection interface plane, which extend in the radial direction with respect to the axis of rotation.

The first and/or second connection interface of a generator segment have a connection device. The connection device at the first and/or second connection interface is formed to connect adjacent generator segments, which are arranged to form a segmented generator, to one another. The connection device of the first and/or second connection interface is formed, in one example, to mechanically connect adjacent generator segments. The mechanical connection can be formed as a force-fit and/or material-fit and/or form-fit connection. In one example, the first and/or second connection interface has a flange connection and/or a screw connection as a connection device for fastening adjacent generator segments in the circumferential direction. The explanations regarding the generator segment can apply accordingly to a rotor segment of a segmented rotor and/or a stator segment of a segmented stator.

The segmented construction of the generator makes it possible to overcome the transport-related size limitations of a generator. In one example, segmented generators can also be transported to wind turbine installation site that are difficult to access and mounted on the nacelle of the wind turbine tower by transporting the generator segments separately. In one example, no large and expensive special cranes are required to install a segmented generator. Rather, the generator segments can be positioned individually on the nacelle or the machine carrier with a smaller main crane, which must only carry the mass of a single generator segment and reach the mounting height. As a result, costs can be saved, which would otherwise be incurred for the much more expensive large main cranes. Furthermore, such large main cranes are generally only available to a limited extent, which means that the segmented generator offers greater flexibility in terms of mounting time and location.

The method comprises several steps. On the one hand, this is a provision of a tower of the wind turbine in an installation state and, on the other hand, a provision of the machine carrier. In the installation state, the tower preferably has a vertical or preferably a substantially vertical tower axis.

The machine carrier is then lifted and positioned at an upper end of the tower so that the machine carrier can be rotatably coupled to the tower via a tower bearing, and the machine carrier is pre-fixed to the tower for mounting purposes so that the machine carrier is rotatably supported relative to the tower by means of the tower bearing.

In the step of pre-fixing the machine carrier to the tower for mounting purposes, the machine carrier is preferably only fixed to the tower for mounting purposes. In one example, it is to be understood that a machine carrier pre-fixed to the tower is only designed for the loads occurring during the mounting of a wind turbine, in particular a segmented generator on the tower. In one example, pre-fixing does not involve fixing the machine carrier to the tower, which ensures reliable operation of the wind turbine. In one example, when the machine carrier is pre-fixed to the tower, the fixation preferably only bears the loads that usually occur during the mounting of a wind turbine, in one example, a segmented generator. In one example, it is to be understood that a machine carrier pre-fixed to the tower is not designed for the loads usually occurring during operation of the wind turbine. In one example, the step of pre-fixing the machine carrier to the tower for mounting purposes corresponds to a step of fixing or fastening the machine carrier to the tower for operation of the wind turbine. In one example, the step of pre-fixing the machine carrier to the tower for mounting purposes can correspond to the step of fixing the machine carrier to the tower for operation of the wind turbine.

In one example, the step of pre-fixing the machine carrier to the tower for mounting purposes comprises producing a minimal screw connection of the machine carrier to the tower via the tower bearing. A minimal screw connection, in one example, comprises at least one screw and up to approximately one quarter, one third, one half or three quarters of the number of screws provided for a maximal screw connection. The maximal screw connection comprises the number of screws provided for connecting the machine carrier to the tower for the operation of the wind turbine.

The method further comprises the step of providing two or more generator segments in a transport position, wherein the stator segment and the rotor segment of the respective generator segment are connected to each other. In one example, the stator segment and the rotor segment are connected to each other in such a way that they are connected to each other with respect to a radial direction and/or an axial direction and/or a circumferential direction for transportation and/or mounting of the generator segment. In one example, flanges and/or screw connections can be provided for the connection between the rotor segment and the stator segment. In one example, the rotor segment and the stator segment are connected to each other in such a way that an annular air gap is created between the rotor segment and the stator segment. In one example, this annular air gap corresponds to the annular air gap required for operation. It is provided that the connection between the rotor segment and the stator segment is released for the operation of the wind turbine. In one example, the connection between the stator segment and the rotor segment of the corresponding generator segment is released as soon as a rotor carrier of a main bearing is connected, in one example bolted, to the rotor segments of the generator segments. In one example, the connection between the stator segment and the rotor segment of the corresponding generator segment is released as soon as a rotor carrier of a main bearing is connected, in one example bolted, to the rotor flange of the rotor segment of the corresponding generator segment.

In one example, the generator segments are in a transport position, for example, when they are provided on a low-loader or temporarily stored on the construction site. In the transport position, the alignment of the generator segments can deviate from the alignment of the generator segments in the mounting position. In one example, the generator segments can be stored horizontally in the transport position so that the axis of rotation extends essentially vertically or the axis of rotation is only slightly inclined in relation to a vertical plane. However, it is also conceivable to store the generator segments upright in the transport position so that the axis of rotation extends essentially horizontally or the axis of rotation is only slightly inclined in relation to a horizontal plane.

In further steps, lifting and positioning of one of the two or more generator segments from the transport position into a mounting position, in which the stator flange is arranged on the machine carrier flange, and the generator segment is pre-fixed for mounting purposes by means of the stator flange on the machine carrier flange in the mounting position, takes place. In one example, in the case of a segmented generator formed from two generator segments, the generator segment is provided in a 6 o'clock position.

In this step, the mounting position is in one example the position of the generator segment that enables the generator segment to be fixed or pre-fixed to the machine carrier. In one example, the mounting position is the position that enables fixing or pre-fixing of the generator segment to the machine carrier flange of the machine carrier by means of the stator flange.

In one example, the axis of rotation of the generator segment to be mounted extends essentially horizontally or is only slightly inclined relative to a horizontal plane. In one example, the axis of rotation of the generator segment to be mounted in the mounting position corresponds to the orientation and position of the axis of rotation in the operating state of the wind turbine or that it merely extends offset parallel to the axis of rotation in the operating state of the wind turbine.

In the step of pre-fixing the generator segment for mounting purposes by means of the stator flange on the machine carrier flange in the mounting position, the generator segment is preferably only fixed for mounting purposes by means of the stator flange on the machine carrier flange. In one example, it is to be understood that a generator segment pre-fixed to the machine carrier flange by means of the stator flange is only designed for the loads occurring during the mounting of a wind turbine, in one example, a segmented generator on the tower. In one example, the generator segment is not fixed to the machine carrier flange by means of the stator flange during pre-fixing, which ensures reliable operation of the wind turbine. When the generator segment is pre-fixed to the machine carrier flange by means of the stator flange, the fixation only bears the loads that usually occur during the mounting of a wind turbine, in one example a segmented generator. In one example, it should be understood that a generator segment pre-fixed to the tower is not designed for the loads that usually occur during operation of the wind turbine.

In one example, the step of pre-fixing comprises the production of a minimal screw connection of the stator flange to the machine carrier flange. A minimal screw connection, in one example, comprises at least one screw and up to approximately one quarter, one third, one half or three quarters of the number of screws provided for a maximal screw connection, whereby the maximal screw connection comprises the number of screws provided for the connection of the stator flange to the machine carrier flange for the operation of the wind turbine.

In one example, fastening connections are provided and/or used for the pre-fixing of generator segments which are different from the fastening connections provided and/or used for the fastening of the generator segments for the operation of the wind turbine.

In one example, the fastening connections on the stator flange for pre-fixing are formed as openings with an internal thread. These openings can be formed as through-holes with internal threads or as blind holes with internal threads. In one example, the openings for pre-fixing on the stator flange are positioned equidistant from each other in the circumferential direction. In one example and for pre-fixing, the machine carrier flange has a through hole through which a screw can be passed for pre-fixing the generator segments and can be screwed into the opening with the internal thread on the stator flange. The screws for pre-fixing can be released as soon as the generator segments have been fastened for operation of the wind turbine.

In one example, the fastening connections on the stator flange for fastening the generator segments for operating the wind turbine are formed as through-holes. In one example, these through-holes do not have an internal thread. For fastening the generator segments for the operation of the wind turbine, in one example, the stator flange is clamped between the axle journal and the motor carrier flange. Accordingly, the axle journal of the main bearing and/or the machine carrier flange can have through-holes as fastening connections. To fasten the generator segments for the operation of the wind turbine, a threaded rod can then be pushed through the through-holes of the axle journal, the stator flange arranged between the axle journal and the machine carrier flange, and the machine carrier flange, for example. By screwing threaded nuts onto both sides of the threaded rod, the generator segment can then be fastened by clamping the stator flange between the machine carrier flange and the axle journal of the main bearing. Alternatively, in one example, a clamping screw can be provided, which is passed through the through-hole of the axle journal and the stator flange and screwed into an opening with an internal thread in the machine carrier flange.

The method further comprises the steps of lifting and positioning at least one further of the two or more generator segments from the transport position to a further mounting position on the machine carrier flange of the machine carrier, so that the already pre-fixed generator segment can be connected to the generator segment positioned in the further mounting position via the connection interfaces of the respective generator segments. In one example, in the case of a segmented generator formed from two generator segments, the generator segment is provided in a 12 o'clock position.

In these steps, too, the axis of rotation of the further generator segment to be mounted preferably extends essentially horizontally or is only slightly inclined relative to a horizontal plane. In one example, the axis of rotation of the generator segment to be mounted in the mounting position corresponds to the orientation and position of the axis of rotation in the state of operation of the wind turbine, or that it merely extends parallel to the axis of rotation in the state of operation of the wind turbine.

This is followed by pre-fixing the further generator segment for mounting purposes in the further mounting position by means of the stator flange on the machine carrier flange and/or on the already pre-fixed generator segment via the connection interfaces of the respective generator segments, whereby the lifting, positioning and pre-fixing steps are repeated with further of the two or more generator segments until the lifted, positioned and fixed generator segments can form the segmented generator.

Also in the step of pre-fixing the further generator segment for mounting purposes by means of the stator flange to the machine carrier flange in the mounting position, the generator segment, in one example, is fixed to the machine carrier flange only for mounting purposes by means of the stator flange. In one example, it is to be understood that a further generator segment pre-fixed to the machine carrier flange by means of the stator flange is only designed for the loads occurring during the mounting of a wind turbine, in one example, a segmented generator on the tower. In one example, the further generator segment is not fixed to the machine carrier flange by means of the stator flange during pre-fixing, which ensures reliable operation of the wind turbine. When the further generator segment is pre-fixed to the machine carrier flange by means of the stator flange, the fixation only bears the loads that usually occur during the mounting of a wind turbine, in one example, a segmented generator. In one example, it should be understood that a further generator segment pre-fixed to the tower is not designed for the loads that usually occur during operation of the wind turbine.

In one example, the step of pre-fixing comprises the production of a minimal screw connection of the stator flange to the machine carrier flange. In one example, a minimal screw connection comprises at least one screw and up to approximately one quarter, one third, one half or three quarters of the number of screws provided for a maximal screw connection, whereby the maximal screw connection comprises the number of screws provided for the connection of the stator flange to the machine carrier flange for the operation of the wind turbine.

In the 12 o'clock position a higher tilting moment acts on the segmented generator than in the 6 o'clock position. Therefore, in one example and in the case of a segmented generator formed from two generator segments, the required number of screws for maximal tightening of the generator segment positioned and pre-fixed in the 6 o'clock position is smaller than the required number of screws for maximal tightening of the generator segment positioned and pre-fixed in the 12 o'clock position. In one example, the number of screws required for the maximal screw connection of the generator segment positioned and pre-fixed in the 6 o'clock position corresponds to one quarter to three quarters of the number of screws required for a maximal screw connection of the generator segment positioned and pre-fixed in the 12 o'clock position. In one example, the number of screws required for the maximal screw connection of the generator segment positioned and pre-fixed in the 6 o'clock position corresponds to one half to three quarters of the number of screws required for the maximal screw connection of the generator segment positioned and pre-fixed in the 12 o'clock position.

In addition, the method comprises the step of providing the main bearing and a hub attached to the main bearing in the transport position, wherein three rotor blade bearings are provided on the hub, wherein the main bearing comprises the rotor carrier and an axle journal, wherein the rotor carrier is rotatably mounted relative to the axle journal for the operation of the segmented generator. In one example, the rotor blade bearings to be provided on each of the rotor blades.

The main bearing with the hub attached to it is in a transport position, for example, when it is provided on a low-loader or temporarily stored on the construction site. In the transport position, the alignment of the main bearing with the hub attached to it can deviate from the alignment of the main bearing with the hub attached to it in the mounting position. In one example, the main bearing with the hub attached to it can be mounted horizontally in the transport position so that the axis of rotation of the main bearing extends essentially vertically or the axis of rotation of the main bearing is only slightly inclined relative to a vertical plane. However, it is also conceivable to mount the main bearing with the hub attached to it in such a way that the axis of rotation of the main bearing extends essentially horizontally or the axis of rotation of the main bearing is only slightly inclined relative to a horizontal plane.

The main bearing is then lifted and positioned so that the stator flange of the stator segment is located between the machine carrier flange and the axle journal. In one example, the main bearing takes up a position in this step that essentially corresponds to the operating position of the main bearing for the operation of the wind turbine.

In addition, the method according to the first aspect comprises attaching the axle flange to the machine carrier flange for the operation of the wind turbine, wherein the stator flange of the stator segment is arranged between the machine carrier flange and the axle journal, wherein the rotor carrier for mounting rotor blades on the hub is not yet or will not yet be connected to the respective rotor segments of the generator segments. This has the advantage that a relative movement between the rotor segments or the rotor and the rotor carrier is possible for mounting the rotor blades. This means that an expensive main crane is only required for the pre-mounting of the wind turbine and for completing the mounting, for example fixing the generator segments with a maximal screw connection or connecting the rotor carrier to the rotor segments. The fastening of generator segments, main bearings, hub, etc., which would otherwise normally require the use of a crane, is possible without the aid of a crane, in one example, without the aid of a main crane. In one example, the demounting or relocation of the crane, especially the main crane, to another location can take place after completion of the pre-mounting, i.e. the pre-fixing of the generator segments and/or the machine carrier as well as the main bearing and the hub, and before completion of the mounting.

In one example, the steps of fastening the axle flange to the machine carrier flange for the operation of the wind turbine and fastening the machine carrier to the tower for the operation of the wind turbine each comprise the production of a maximal screw connection.

For the maximal screw connection the number of bolts are provided that are required for the connection of the stator flange to the machine carrier flange for the operation of the wind turbine or to connect the machine carrier to the tower for the operation of the wind turbine.

In one aspect, the present disclosure is based on the finding that mounting time is saved while an expensive and only limited available main crane is planned and provided on the construction site. By initially only pre-fixing the generator segments of the segmented generator on the one hand and those of the machine carriers on the other hand, for example, by producing only a minimal screw connection, the main crane can be demounted early and moved to its next place of use. The method according to the first aspect therefore means that the expensive and often only partially available main crane only has to be provided for the duration of the pre-fixing, but not for the duration of the fastening, as is necessary for the operation of the wind turbine. The fixing steps, such as the production of the maximal screw connections, can therefore take place after the main crane has already been moved to the next location.

According to an example embodiment, the method comprises the following steps: Providing a first rotor blade, lifting and positioning the first rotor blade at a first rotor blade bearing of the three rotor blade bearings, and attaching the first rotor blade to the first rotor blade bearing. In one example, the first rotor blade bearing is provided in a 4 o'clock position or in an 8 o'clock position, so that the first rotor blade is fastened to the first rotor blade bearing in the 4 o'clock position or in the 8 o'clock position.

A 4 o'clock position corresponds to a 120° position of the rotor blade, in which the rotor blade is rotated by 120° in a clockwise direction in relation to a 12 o'clock position of the rotor blade. In one example, an 8 o'clock position of the rotor blade corresponds to a position in which the rotor blade is rotated clockwise by 240° in relation to a 12 o'clock position of the rotor blade. In this position, the mounting of the rotor blade on the hub is easy. Furthermore, a comparatively low torque acts on the hub in this position while the rotor blade is mounted on the hub.

In one example, the hub is rotated with the aid of a main crane so that the rotor blade bearing is provided in the desired position, for example in the 4 o'clock position or in the 8 o'clock position. The rotation of the hub is possible in an advantageous way, as the rotor carrier of the main bearing is not yet fastened to the rotor segment at this stage of mounting, but the axle journal of the main bearing is fastened to the machine carrier. For single blade mounting, the hub and rotor carrier can therefore be turned without turning the rotor segment itself. This has the effect that all mounting work for which the main crane is absolutely necessary is carried out first, before mounting work for which the main crane is not absolutely necessary is carried out. As a result, the main crane can be relocated to another site more quickly, thus reducing the costs of providing and using the main crane.

According to an example embodiment, the method comprises the following steps: providing a second rotor blade, lifting and positioning the second rotor blade at a second rotor blade bearing of the three rotor blade bearings, and fastening the second rotor blade to the second rotor blade bearing, wherein preferably the second rotor blade bearing is provided in a 4 o'clock position or in an 8 o'clock position, such that a fastening of the second rotor blade to the second rotor blade bearing takes place in the 4 o'clock position or in the 8 o'clock position.

This has the advantage that while fastening the second rotor blade no torque acts on the hub since the torques induced by the two rotor blades cancel each other out.

Furthermore, the procedure according to an example embodiment includes the following steps: providing a third rotor blade, rotating the hub with the two attached rotor blades so that one of the two rotor blades is aligned in a 10 o'clock position and the other of the two rotor blades is aligned in a 6 o'clock position, lifting and positioning the third rotor blade on a third rotor blade bearing of the three rotor blade and fastening the third rotor blade to the third rotor blade bearing, wherein the third rotor blade bearing is provided in a 2 o'clock position or in a 10 o'clock position, so that the third rotor blade is fastened to the third rotor blade bearing in the 2 o'clock position or in the 10 o'clock position.

According to an example embodiment of the method, it is provided that the stator segment of at least one generator segment, in the region of the stator flange, has a locking device and the rotor carrier of the main bearing has a locking receiver in which the locking device can engage in order to prevent a rotational movement of the rotor carrier and thus of the hub relative to the stator segment and the machine carrier, respectively, during the mounting of one of the rotor blades in a mounting position, and can release the rotor carrier and thus the hub relative to the stator segment and the machine carrier, respectively, to allow a rotational movement of the rotor carrier and thus of the hub relative to the stator segment and the machine carrier, respectively, into a desired mounting position for the mounting of one of the rotor blades.

This has the advantage that the mounting of individual blades can continue immediately after the mounting of the generator segments and the mounting of the main bearing pre-mounted with the hub. This is because the hub and rotor carrier unit can already be rotated by a crane between different (mounting) positions and can be locked in different (mounting) positions. This is achieved in an advantageous arrangement of the locking receivers on the rotor carrier of the main bearing and the resulting still possible relative movement of the rotor carrier and hub, due to the still open flange. This saves valuable mounting time in an advantageous way while the expensive main crane is on the construction site, and makes it possible to attach the generator segments of the segmented generator without an expensive main crane, in one example, with a maximal screw connection. The expensive main crane can thus be demounted and the generator segments can be fastened without the expensive main crane.

In this embodiment, the method comprises the following steps: locking the rotor carrier of the main bearing on the stator segment and/or the machine carrier before mounting the first rotor blade on the hub, and releasing the lock after mounting the first two rotor blades on the hub, and turning the hub with the two mounted rotor blades before mounting the third rotor blade so that one of the two already mounted rotor blades is aligned in a 6 o'clock position and the other of the two rotor blades is aligned in a 10 o'clock position or in a 2 o'clock position, locking the rotor carrier of the main bearing to the stator segment and/or the machine carrier before mounting the third rotor blade to the hub, and mounting the third rotor blade to the hub. In one example, the lock is released after the third rotor blade has been mounted on the hub.

In one example, a lock be applied with the locking device when a desired mounting position is provided. When the locking device locks, it prevents the rotor carrier or the hub connected to the rotor carrier from rotating relative to the machine frame.

Furthermore, according to an example embodiment of the method, the locking device has at least one displaceable locking bolt and the locking receiver on the rotor carrier forms at least one bolt receiver opening corresponding to the locking bolt, wherein the step of locking comprises displacing the at least one locking bolt into the corresponding bolt receiving opening and/or the step of releasing comprises displacing the at least one locking bolt out of the corresponding bolt receiving opening.

In one example, when mounting a rotor blade, the locking bolt is inserted into the locking receiver in the mounting position. To mount another rotor blade, the locking device is released, i.e. the locking bolt is pushed out of the locking receiver so that the hub can be turned to the mounting position for the next rotor blade, in which the locking bolt is then pushed back into the locking receiver to prevent the hub from twisting during the mounting of the other rotor blade.

According to a further example embodiment, the method comprises the steps of connecting the rotor carrier to the corresponding rotor segments of the generator segments and then releasing the stator segment from the rotor segment so that the rotor can rotate relative to the stator. In this process step, for example, it is intended to release flanges and/or screw connections that connect the rotor segment and the stator segment of a generator segment to one another. Preferably, this step is carried out after the three rotor blades have been fastened. In one example, this process step can be carried out without the use of a main load crane. This has the advantage of reducing the time required for the main load crane and thus the mounting costs.

Furthermore, according to an example embodiment of the method, the generator segments are each extended in the circumferential direction between two connection interfaces, comprising the steps of: preparing the connection interfaces of the generator segments for the fastening of adjacently arranged generator segments, and fastening the connection interfaces of the adjacently arranged generator segments. The connection interfaces can be used to connect generator segments that are arranged adjacent to one another in the circumferential direction in one example embodiment.

According to a further example embodiment of the method, this comprises the following steps: fastening the pre-fixed generator segments for the operation of the wind turbine, in one example after the mounting of the rotor blades and/or without the aid of a crane, in one example, without the aid of a main load crane, and/or fastening the pre-fixed machine carrier to the tower for the operation of the wind turbine, in one example after the mounting of the rotor blades and/or without the aid of a crane, in one example without the aid of a main load crane. In one example, the fastening of the pre-fixed generator segments and/or the machine carrier is carried out without the aid of a main crane.

Furthermore, according to an example embodiment, the method comprises the step of: attaching the rotor carrier to the rotor segments of the generator segments after the rotor blades have been fastened to the hub without the aid of a crane. In one example, the rotor carrier is fastened to the rotor segments of the generator segments without the aid of a main crane. In one example, this step is carried out after the three rotor blades have been fastened.

The aforementioned problem is solved by a generator segment according to claim 11, in accordance with a second aspect. This generator segment is a generator segment for a segmented generator of a wind turbine.

The generator segment has a stator segment and a rotor segment. The stator segment is provided with a stator flange for fastening the stator segment to a machine carrier flange of a machine carrier. The rotor segment has a rotor flange for fastening to a rotor carrier of a main bearing. The generator segment extends in the circumferential direction between two connection interfaces that are formed for connection to connection interfaces of generator segments arranged adjacent to it in the circumferential direction.

The stator segment can be coupled to the rotor segment by means of a locking device for mounting purposes, the locking device being provided in the region of the rotor flange and the stator flange, so that the rotor segment and the stator segment have at least one locking receiver formed as a bolt receiver opening in the region of the rotor flange and the stator flange, through which a locking bolt for locking the rotor carrier to the stator segment can be inserted from a release position in each case, so that the locking device takes up a locking position, the locking bolt being removable from the locking receiver for the operation of the segmented generator, so that the locking device takes up a release position.

Accordingly and in one example, the locking bolt is inserted into the locking receiver in a locking position of the locking device for mounting purposes. In the locking position, a relative displacement between the stator segment and the rotor carrier is prevented to this extent. In one example, a relative rotational movement of the rotor carrier with respect to the stator segment is prevented in the locking position. In addition or as an alternative, in the locking position, a relative translational movement of the rotor carrier with respect to the stator segment is prevented. In a release position of the locking device, which is different from the locking position, the locking bolt is not inserted into the locking receiver. In the release position of the locking device, relative movement between the rotor carrier and the stator segment is released and possible. In one example, in the release position of the locking device, relative rotation between the rotor carrier and the stator segment is released and/or relative translational movement between the rotor carrier and the stator segment is released.

In addition or as an alternative, it is provided that the stator flange has fastening connections for pre-fixing the generator segment to the machine carrier flange for mounting purposes and has fastening connections for fastening the generator segment to the machine carrier flange for the operation of the wind turbine. In one example, the fastening connections provided and/or used for the pre-fixing of generator segments are different from the fastening connections provided and/or used for the fastening of the generator segments for the operation of the wind turbine.

In one example, the fastening connections for pre-fixing on the stator flange are formed as openings with internal threads. These openings can be formed as through-holes with internal threads or as blind holes with internal threads. In one example, the openings for pre-fixing on the stator flange are positioned equidistantly from one another in the circumferential direction. In one example and for the pre-fixing, the machine carrier flange has a through-hole through which a screw can be passed for the pre-fixing of the generator segments and can be screwed into the opening with the internal thread on the stator flange. The screws for pre-fixing can be released as soon as the generator segments have been fastened for the operation of the wind turbine.

In one example, the fastening connections for fastening the generator segments for operation of the wind turbine are formed as through-openings on the stator flange. In one example, these through-holes have no internal thread. In one example, for the fastening of the generator segments for the operation of the wind turbine, the stator flange is clamped between the axle journal and the motor carrier flange. Accordingly, the axle journal of the main bearing and/or the machine carrier flange can have through-holes as fastening connections. For example, to fasten the generator segments for the operation of the wind turbine, a threaded rod can be pushed through the through-holes of the axle journal, the stator flange arranged between the axle journal and the machine carrier flange, and the machine carrier flange. The generator segment can then be fastened by screwing threaded nuts onto the threaded rod on both sides, so that the stator flange is clamped between the machine carrier flange and the axle journal of the main bearing. Alternatively, a turnbuckle can be used, which is passed through the through-hole of the axle journal and the stator flange and screwed into a threaded hole with an internal thread in the machine carrier flange.

The aforementioned problem is solved by a segmented generator according to a third aspect of claim 12. This segmented generator is a segmented generator for a wind turbine, having two or more generator segments. These generator segments can be formed as described above according to the second aspect.

The aforementioned problem is solved by a wind turbine in accordance with a fourth aspect, according to claim 13. This wind turbine has a generator segment, as described above in accordance with the second aspect, and/or has a segmented generator, as described above according to the third aspect.

For the advantages, design variants and design details of these further aspects of the present disclosure and their developments, please also refer to the above description of the corresponding features of the method for mounting a segmented generator of a wind turbine or the respective other aspects.

Embodiments of the present disclosure will now be described below with reference to the figures. These are not necessarily intended to show the embodiments to scale; rather, the figures are shown in a schematized and/or slightly distorted form if this serves to clarify the description. With regard to additions to the teachings that are directly recognizable from the figures, reference is made to the relevant prior art. It should be noted that a wide range of modifications and changes can be made to the shape and details of an embodiment without deviating from the general idea of the present disclosure. The features of the present disclosure disclosed in the description, figures and claims may be essential to further developing the present disclosure, either individually or in any combination. In addition, all combinations of at least two of the features disclosed in the description, figures and/or claims fall within the scope of the present disclosure. The general idea of the present disclosure is not limited to the exact form or detail of the example embodiments shown and described below or limited to subject matter that would be restricted in comparison to the subject matter claimed in the claims. Where ranges of values are given, values within the stated limits are also intended to be disclosed as limit values and to be used and claimed as desired. For the sake of simplicity, identical reference signs are used below for identical or similar parts or parts with identical or similar functions.

BRIEF DESCRIPTION OF THE SEVERAL VIEWS OF THE DRAWINGS

Further advantages, features and details of the present disclosure will become apparent from the following description of the example embodiments and the figures, which show in.

DETAILED DESCRIPTION

Figure 1:
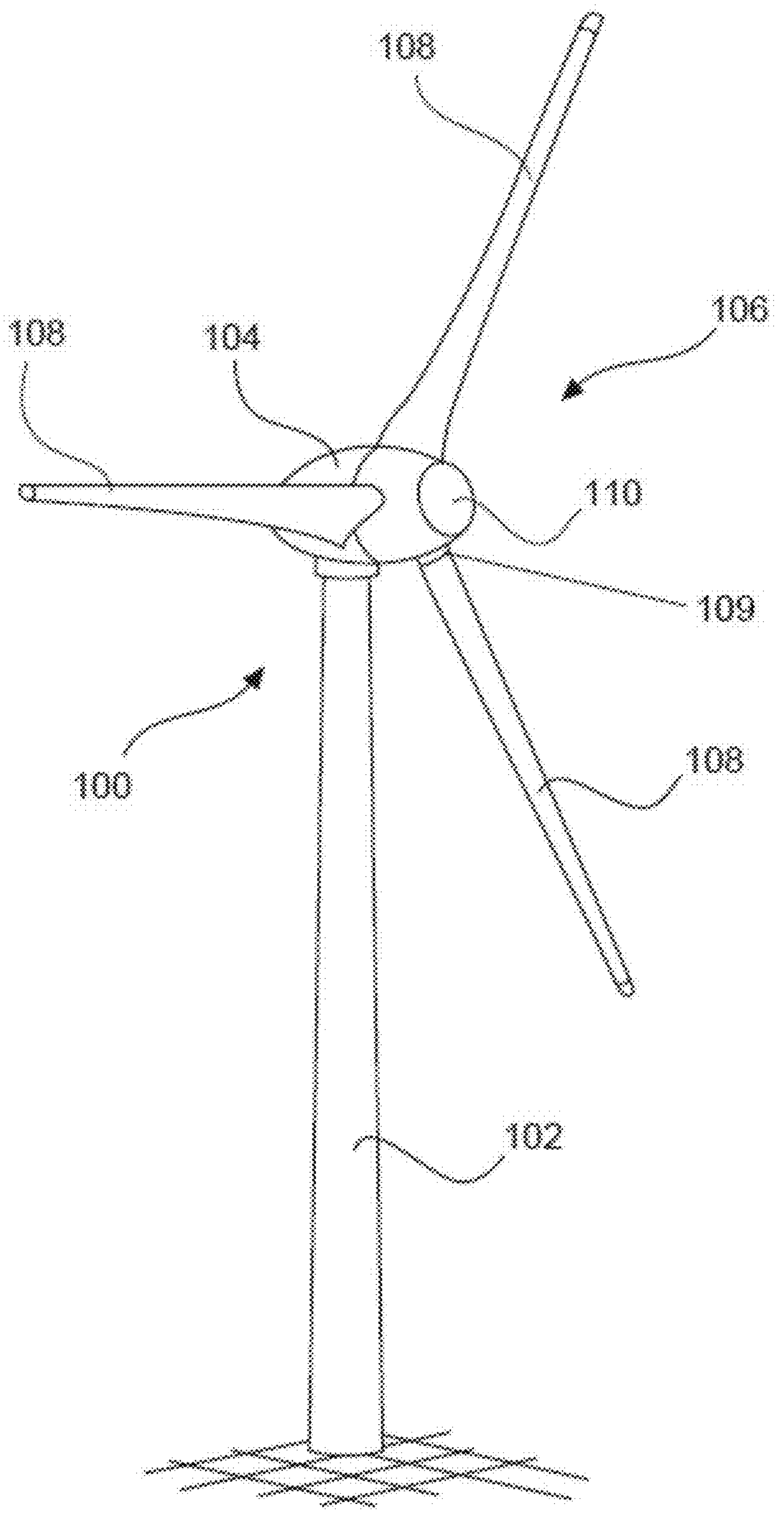
FIG. 1: a schematic three-dimensional view of an exemplary embodiment of a wind turbine.

FIG. 1 shows a schematic representation of a wind turbine according to some aspects of the present disclosure. The wind turbine 100 comprises a tower 102 and a nacelle 104 on the tower 102. An aerodynamic rotor 106 with three rotor blades 108 and a spinner 110 is provided on the nacelle 104. When the wind turbine is in operation, the aerodynamic rotor 106 is set in rotation by the wind and thus also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 109 of the respective rotor blades 108.

Figure 2:
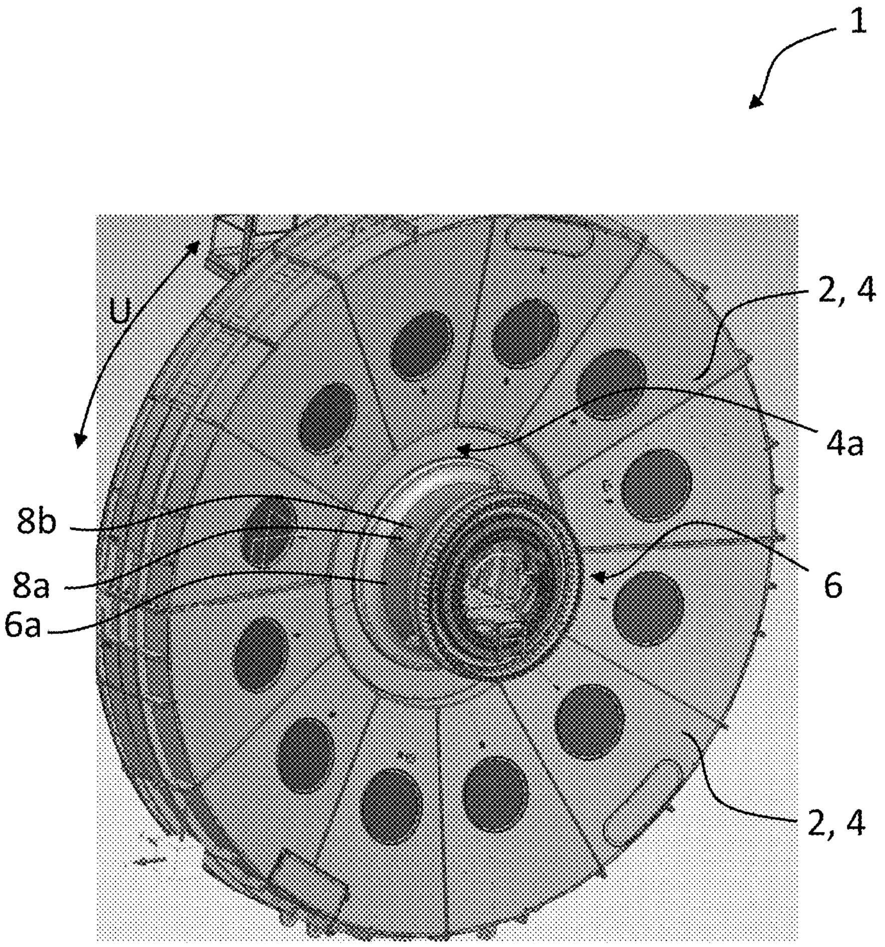
FIG. 2: a schematic three-dimensional view of an exemplary embodiment of a segmented generator.
Figure 3:
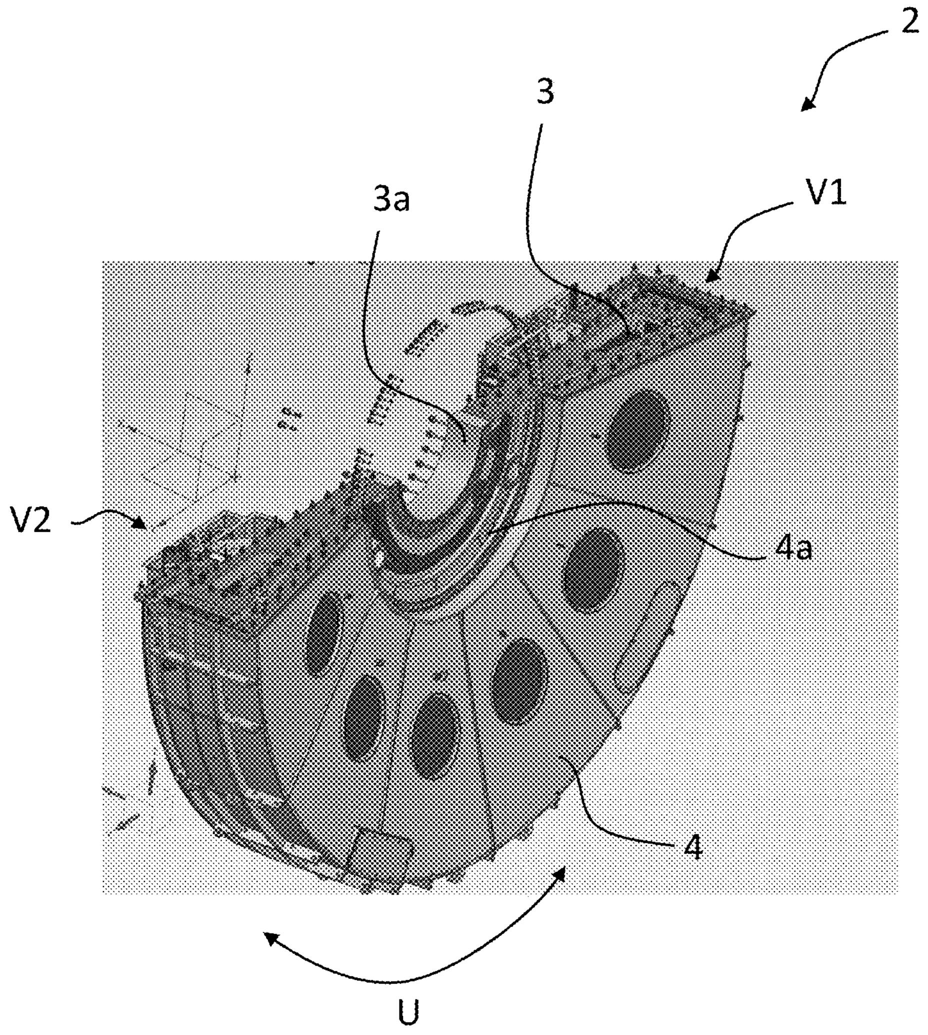
FIG. 3: a schematic three-dimensional view of an exemplary embodiment of a generator segment of the segmented generator shown in FIG. 2.

The exemplary embodiment of a wind turbine 100, schematically represented in FIG. 1, comprises a segmented generator, as schematically represented in an example embodiment in FIG. 2. This segmented generator 1 comprises two generator segments 2, as represented in FIG. 3, for the operation of the wind turbine 100. These generator segments 2 each have a stator segment 3 and a rotor segment 4. The two generator segments, or rather their stator segment and rotor segment, each extend 180° in the circumferential direction between two connection interfaces V1, V2. The two generator segments 2 are each connected to one another via the connection interfaces V1, V2. This can be seen in FIG. 2. For fastening the two generator segments to the connection interfaces centering pins or centering bolts and screw connections are provided. The rotor segment and the stator segment of the respective generator segment and thus the air gap L between the segmented rotor and the segmented stator for the operation of the wind turbine 100 are aligned by means of centering pins or centering bolts.

The stator segment 3 is fastened to a machine carrier 5 for the operation of the wind turbine. For this purpose, the stator segment 3 has a stator flange 3*a* and the machine carrier 5 comprises a machine carrier flange 5*a*. In the example embodiment shown here, the stator flange 3*a* can be attached to the machine carrier flange 5*a* by means of a screw connection. The machine carrier 5 with the machine carrier flange 5*a* is not shown in FIG. 3.

For the operation of the wind turbine, the rotor segment 4 is attached to a main bearing 6. For this purpose, the rotor segment 4 has a rotor flange 4*a*, via which the rotor segment is attached to a rotor carrier 6*a* of the main bearing 6. In the example embodiment shown here, the rotor flange 4*a* can be fastened to the rotor carrier 6*a* by means of a screw connection. This screw connection is also not shown in FIG. 2.

The example embodiment of a segmented generator 1 and a generator segment 2, respectively, as shown in FIGS. 2 and 3, further comprises a locking device 8. This is evident from FIG. 4, which is a detailed view of the segmented generator shown in FIG. 2 without the main bearing. The locking device 8 comprises a locking bolt 8*a*. On the other hand, a locking receiver is provided, which forms a bolt receiver opening 8*b* corresponding to the locking bolt 8*a*. In FIG. 2, the locking device 8 is shown in a locking position in which the locking bolt 8*a* is pushed into the corresponding bolt receiver opening 8*b* of the locking receiver. In this position, a relative rotational movement of the rotor carrier with respect to the stator segment is prevented. For operation, the locking device 8 takes up a release position in which the locking bolt 8*a* is pushed out of the bolt receiving opening 8*b* of the locking receiver, so that the rotor carrier can perform a relative rotational movement with respect to the stator segment during operation.

In the present embodiment, the stator segment of the respective generator segment has a locking device in the region of the stator flange, which engages in the locking receiver provided in the main bearing in order to prevent a rotational movement of the rotor carrier and thus of a hub 7 with respect to the stator segment or the machine carrier 5 during the mounting of the rotor blades.

Figure 4:
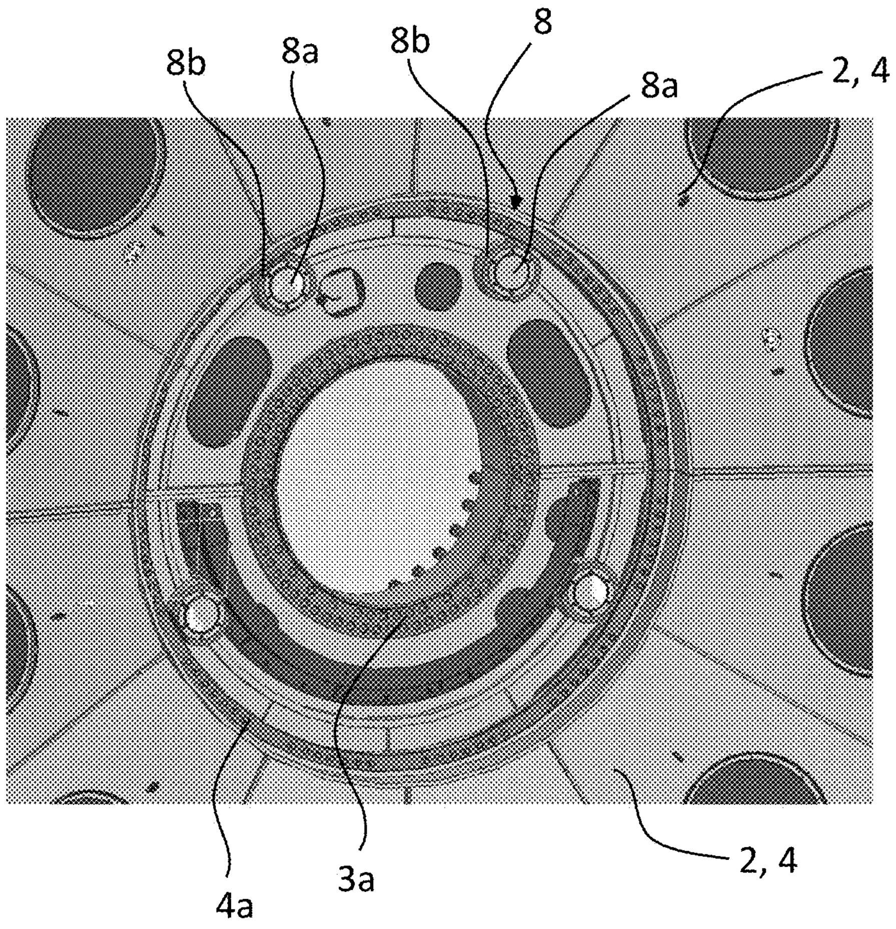
FIG. 4: a schematic detailed view of the segmented generator shown in FIG. 2.

For the embodiments shown in FIGS. 2 to 4 it is provided, that three rotor blades 108 are each rotatably connected to the hub 7 via a rotor blade bearing 7*a*. Furthermore, it is provided that the hub 7 is connected to the machine frame via the main bearing 6. This is not shown in FIGS. 2 to 4.

Figure 5:
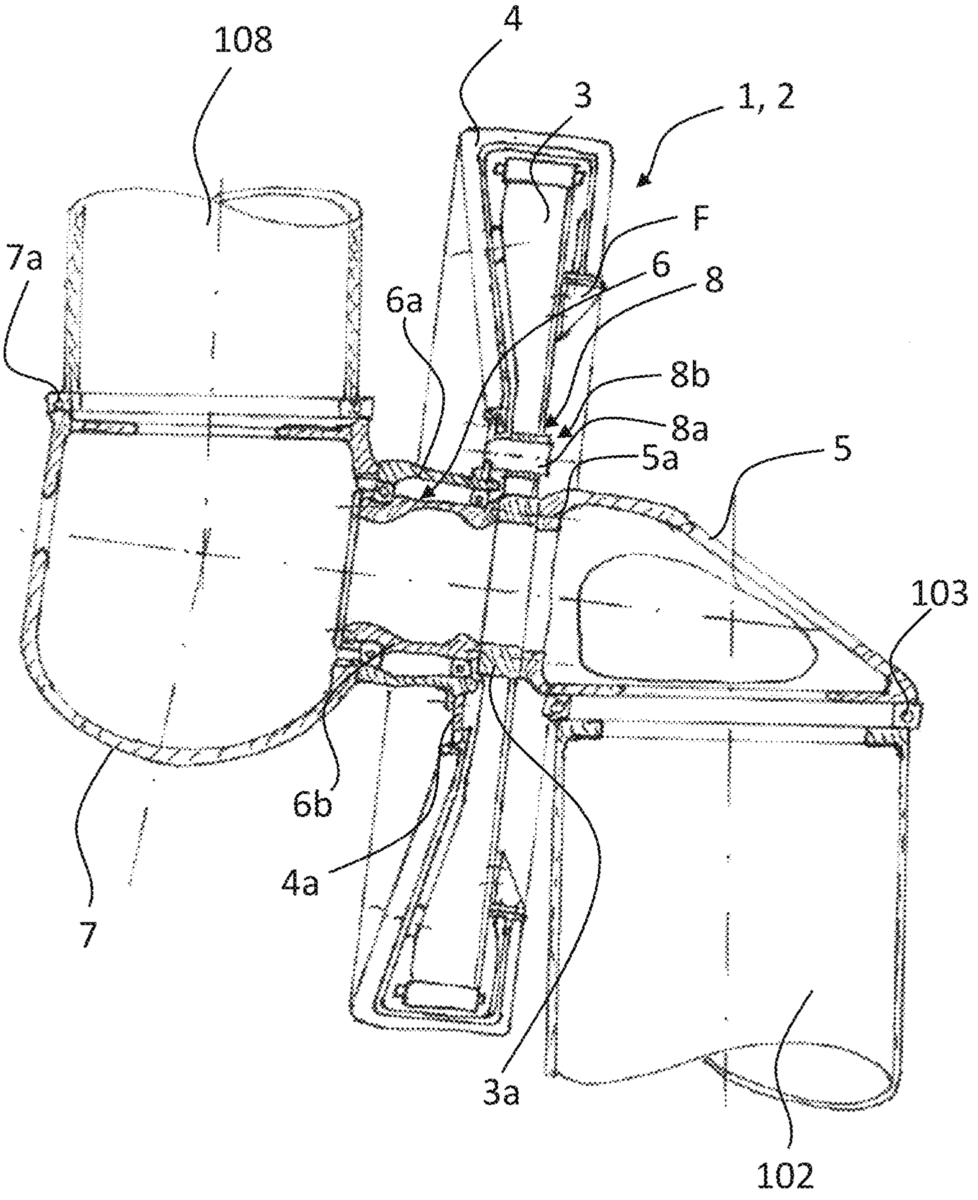
FIG. 5: a schematic sectional view of the segmented generator shown in exemplary fashion in FIGS. 2-4 in the mounted state.

However, the schematic figure in FIG. 5 shows a principle structure of a wind turbine 100 according to some aspects of the present disclosure with the previously described generator segments 2 or the previously described segmented generator 1.

FIGS. 6*a* to 6*d* schematically show a procedure for mounting a wind turbine with generator segments of the segmented generator shown in FIGS. 2 to 4, according to a possible embodiment.

The method initially comprises the steps of providing 1010 a tower 102 of the wind turbine 100 in an installation state, providing 1020 the machine carrier 5 and lifting and positioning 1030 of the machine carrier 5 at an upper end of the tower 102, so that the machine carrier 5 can be coupled rotatably to the tower 102 via a tower bearing 103. The machine carrier was initially only pre-fixed to the turret for mounting purposes in accordance with the pre-fixing 1040 process step, so that the machine carrier 5 is rotatably mounted relative to the tower 102 by means of the tower bearing 103.

Furthermore, it can be seen in FIG. 3 that two generator segments 2 were provided in a transport position 1050, the stator segment 3 and the rotor segment 4 of the respective generator segment 2 being connected to one another.

Figure 7:
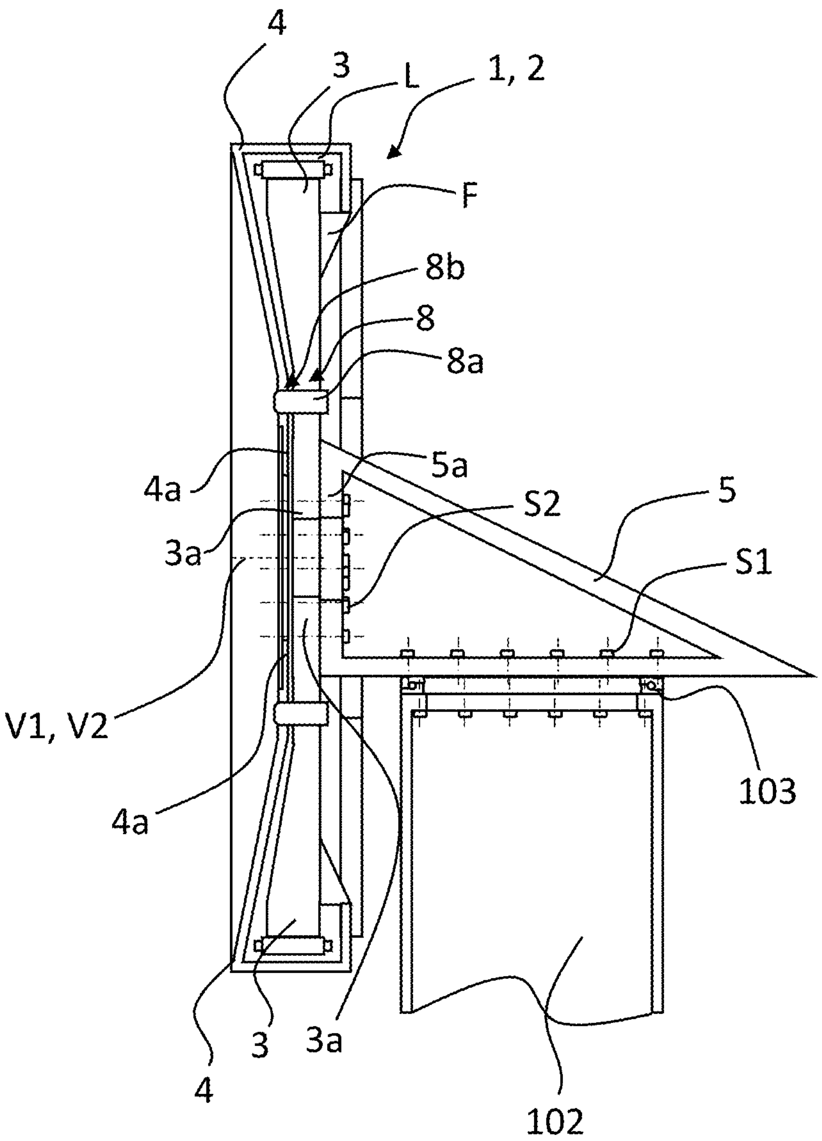
FIG. 7: a schematic sectional view of a wind turbine to be mounted in a first intermediate mounting stage.

FIG. 7 shows a cross-section of a corresponding tower 102, to the upper side of which a tower bearing is bolted. A machine carrier 5 is positioned on the upper side of the tower bearing 103, which, as previously described, has been pre-fixed by means of screws S1 to the tower bearing for mounting purposes. Furthermore, in this example embodiment, it can be seen that the rotor segment and the stator segment are connected by a flange F by means of a screw connection (not shown).

Figure 6:
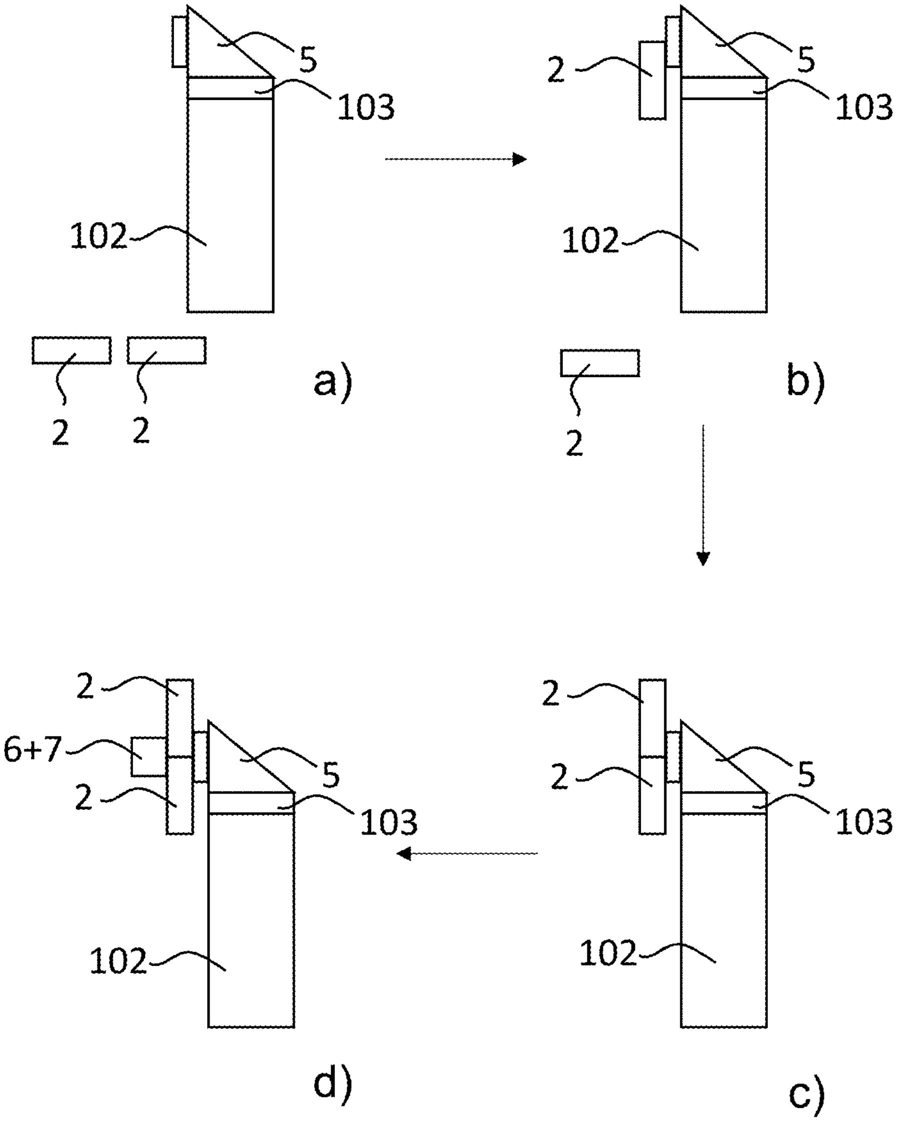
FIG. 6*a*-*d*: a schematic sequence of the mounting of a wind turbine with the generator segments of the segmented generator shown in FIGS. 2-4.

FIG. 6*b* shows a generator segment 2 that has been lifted and positioned from the transport position to a mounting position at a 6 o'clock position in accordance with the lifting and positioning steps 1060, so that the stator flange 3*a* is arranged on the machine carrier flange 5*a*. Furthermore, the pre-fixing step 1070 has been carried out in this mounting position, in which the generator segment 2 has been pre-fixed to the machine carrier flange 5*a* for mounting purposes by means of the stator flange 3*a*. This is realized via a screw connection S2. Accordingly, the machine carrier has through-holes on the machine carrier flange 5*a* and the stator flange has blind-hole bores with an internal thread. For pre-fixing, the screws are inserted through the through-holes on the machine carrier flange 5*a* and screwed into the blind-hole bores with the internal thread in the stator flange.

FIG. 6*c* shows the second generator segment in the mounting position, which was lifted and positioned from the transport position to a further mounting position in a 12 o'clock position on the machine carrier flange 5*a* of the machine carrier 5, so that the already pre-fixed generator segment 2 can be connected to the generator segment positioned in the further mounting position via the connection interfaces of the respective generator segments. In this position, the further generator segment 2 was pre-fixed 1090 for mounting purposes by means of the stator flange 3*a* at the connection interfaces connection, V2 of the already pre-fixed generator segment and the machine carrier flange 5*a* in this further mounting position (12 o'clock position).

This intermediate step, in which the two generator segments are pre-fixed to the machine carrier, can be seen in FIG. 7.

Finally, FIG. 6*d* shows the main bearing 6, which is provided in accordance with the process step providing 1100 of the main bearing 6, to which a hub 7 is fastened, which has three rotor blade bearings 7*a* (not shown in FIG. 6*d*). A corresponding rotor blade bearing 7*a* can be seen in FIGS. 5 and 8-10. The main bearing 6 was lifted together with the hub and positioned 1110 so that the stator flange 3*a* of the stator segment 3 is positioned between the machine carrier flange 5*a* and the axle journal 6*b*. In the mounting progress shown in FIG. 3*d*, it is further intended that the axle flange 6*b* is fastened 1120 to the machine carrier flange 5*a* for the operation of the wind turbine, wherein the stator flange 3*a* of the stator segment 3 is positioned between the machine carrier flange 5*a* and the axle journal 6*b*, and the machine carrier is fastened 1130 to the tower 102 for the operation of the wind turbine 100.

Figure 8:
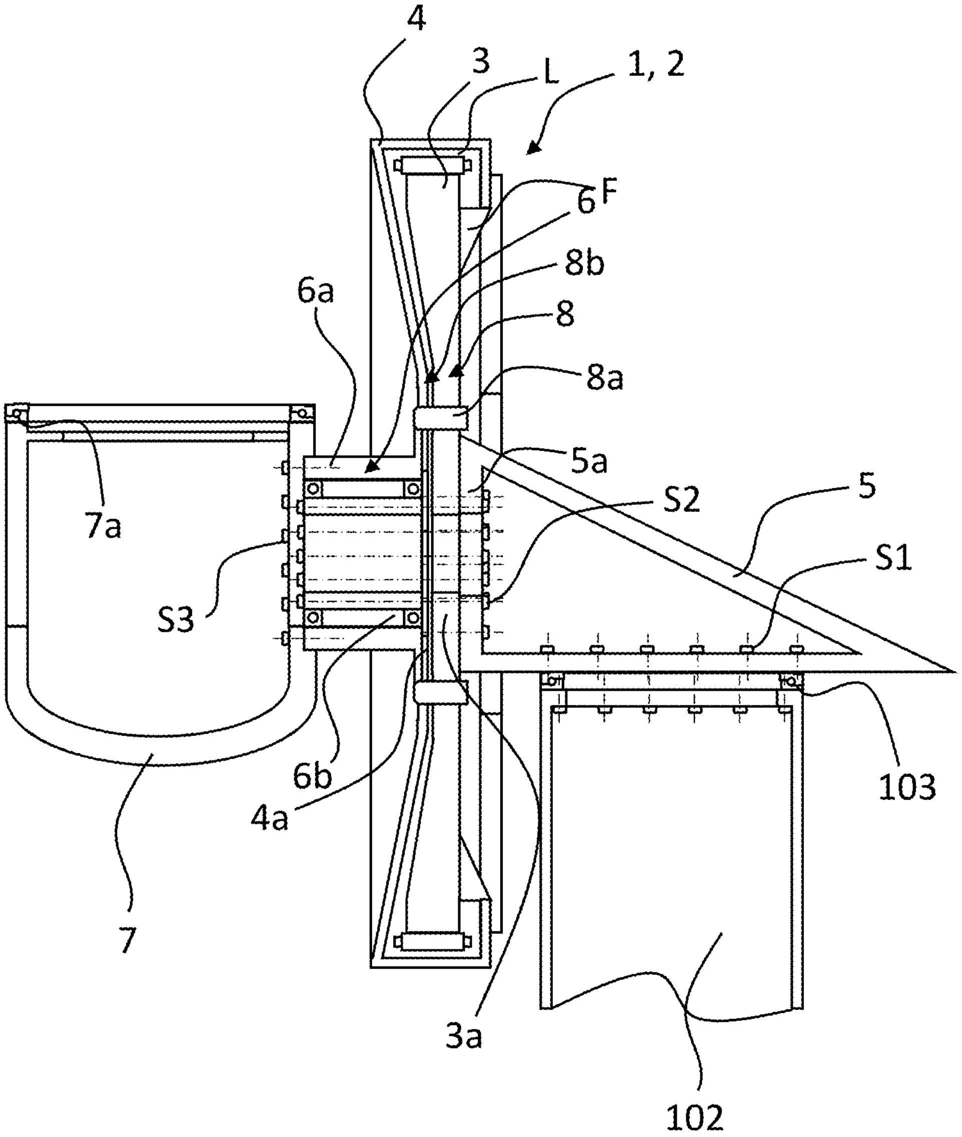
FIG. 8: a schematic sectional view of a wind turbine to be mounted in a second intermediate mounting stage.

This is shown in FIG. 8. It can be seen that the hub is fastened to the rotor carrier 6*a* of the main bearing 6 by means of a screw connection S3. Furthermore, FIG. 8 shows that the axle journal 6*b* of the main bearing 6 is fastened to the machine carrier flange 5*a*. For this purpose, the axle journal 6*b*, the stator flange 3*a* and the machine carrier flange 5*a* have through-holes through which an S4 bolt of the appropriate length extends. To fix the stator flange and the axle journal to the machine carrier flange 5*a* for the operation of the wind turbine, threaded nuts are screwed onto the screws. Accordingly, a clamping force acts via the screws, fixing the stator flange and the axle journal and the machine carrier flange to each other for the operation of the wind turbine.

Figure 9:
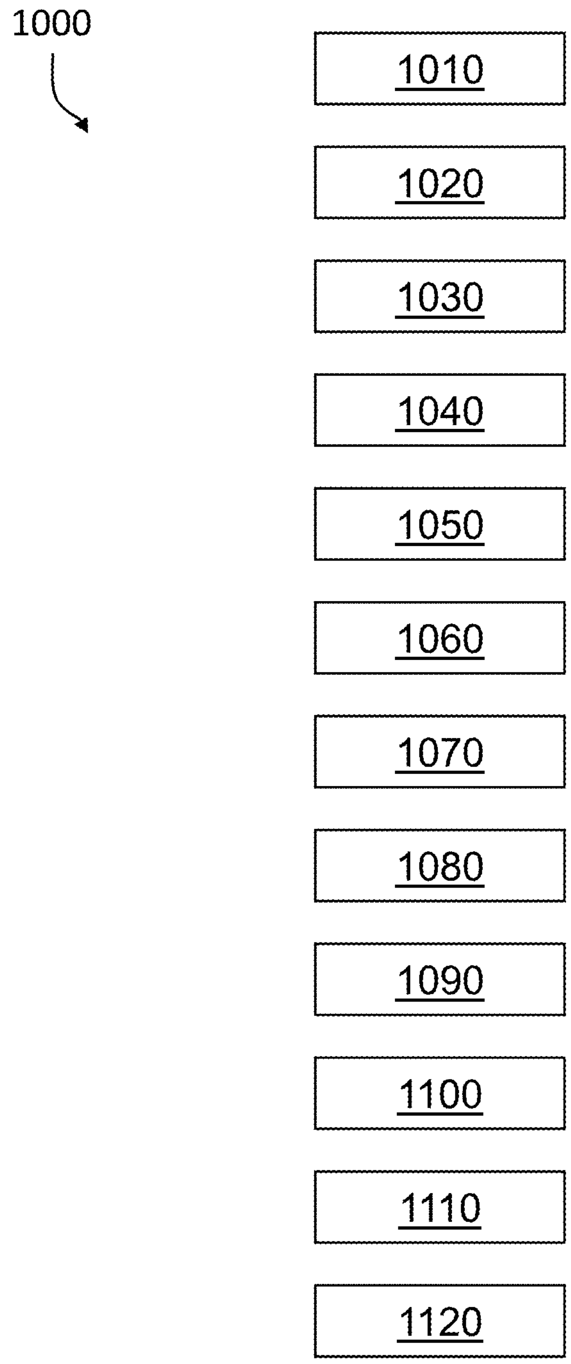
FIG. 9: a schematic block diagram of a method for mounting a wind turbine with a segmented generator.
Figure 10:
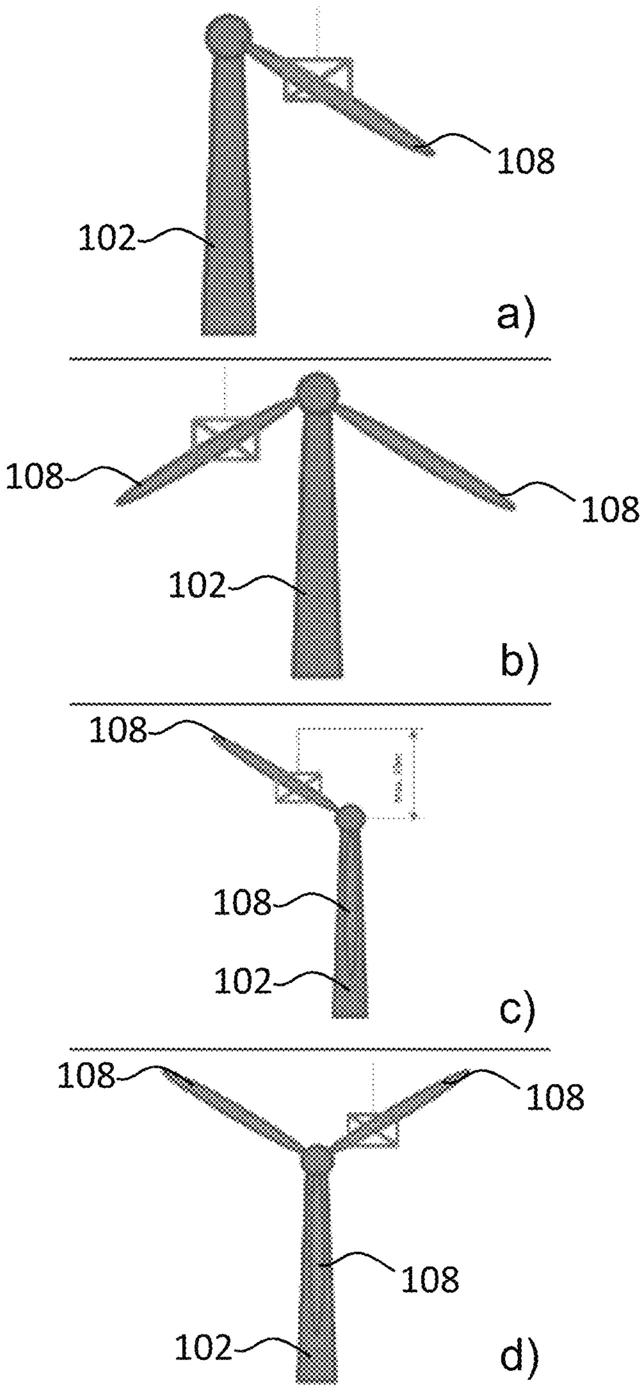
FIG. 10*a*-*d*: a schematic sequence of the mounting of rotor blades on a segmented generator.

FIG. 9 shows a schematic block diagram of the process 1000 for mounting a wind turbine with the segmented generator shown in FIGS. 2-4, as described in relation to FIGS. 3*a* to 3*d* and FIGS. 7 and 8.

FIGS. 10*a* to 10*d* show a schematic sequence of the mounting of rotor blades on the segmented generator according to a possible embodiment. The mounting sequence of the rotor blades shown there follows on from the process steps described in relation to FIGS. 6*a* to 6*d* and 9.

The method provides for the provision of a first, second and third rotor blade. First, the first rotor blade is lifted and positioned and attached to a first of the three rotor blade bearings 7*a*. This is shown in FIG. 10*a*. In this example embodiment, the first rotor blade bearing 7*a* is provided in a 4 o'clock position, so that the first rotor blade 108 is fastened to the first rotor blade bearing 7*a* in the 4 o'clock position. Subsequently, the second rotor blade is lifted and positioned and fastened to a second rotor blade bearing of the three rotor blade bearings 7*a*. In this example embodiment, the second rotor blade bearing 7*a* is provided in an 8 o'clock position, so that the second rotor blade 108 is fastened to the second rotor blade bearing 7*a* in the 8 o'clock position. This is shown in FIG. 10*b*. Rotation to the 8 o'clock position is also carried out with the help of a main crane.

For the mounting of the third rotor blade, the hub with the two fastened rotor blades is turned so that one of the two rotor blades is aligned in a 10 o'clock position. In one example, the second rotor blade is aligned in the 10 o'clock position and the first rotor blade is aligned in the 6 o'clock position. This alignment of the rotor blades with the hub is shown in FIG. 10*c*. The third rotor blade is then mounted in the 2 o'clock position, as shown in FIG. 10*d*. The mounting of the third rotor blade is then analogous to the mounting of the first two rotor blades, i.e. first the third rotor blade is lifted and positioned at a third rotor blade bearing of the three rotor blade bearings and fixed there.

In one example it is provided, that the method provides to lock the rotor carrier 6*a* of the main bearing 6 to the stator segment 3 or the machine carrier 5 before the first rotor blade 108 is mounted on the hub 7 using the previously described locking device 8. The lock is then released after the first two rotor blades 108 have been mounted on the hub, i.e. the locking bolts are moved out of the locking receiver. The hub 7 is then turned together with the two mounted rotor blades 108 before the third rotor blade 108 is mounted, so that one of the two already mounted rotor blades is aligned in a 6 o'clock position and the other of the two rotor blades is aligned in a 10 o'clock position or in a 2 o'clock position. If a new lock has been applied before the third rotor blade is mounted, the procedure provides for the lock to be released after the three rotor blades have been mounted on the hub.

Figure 11:
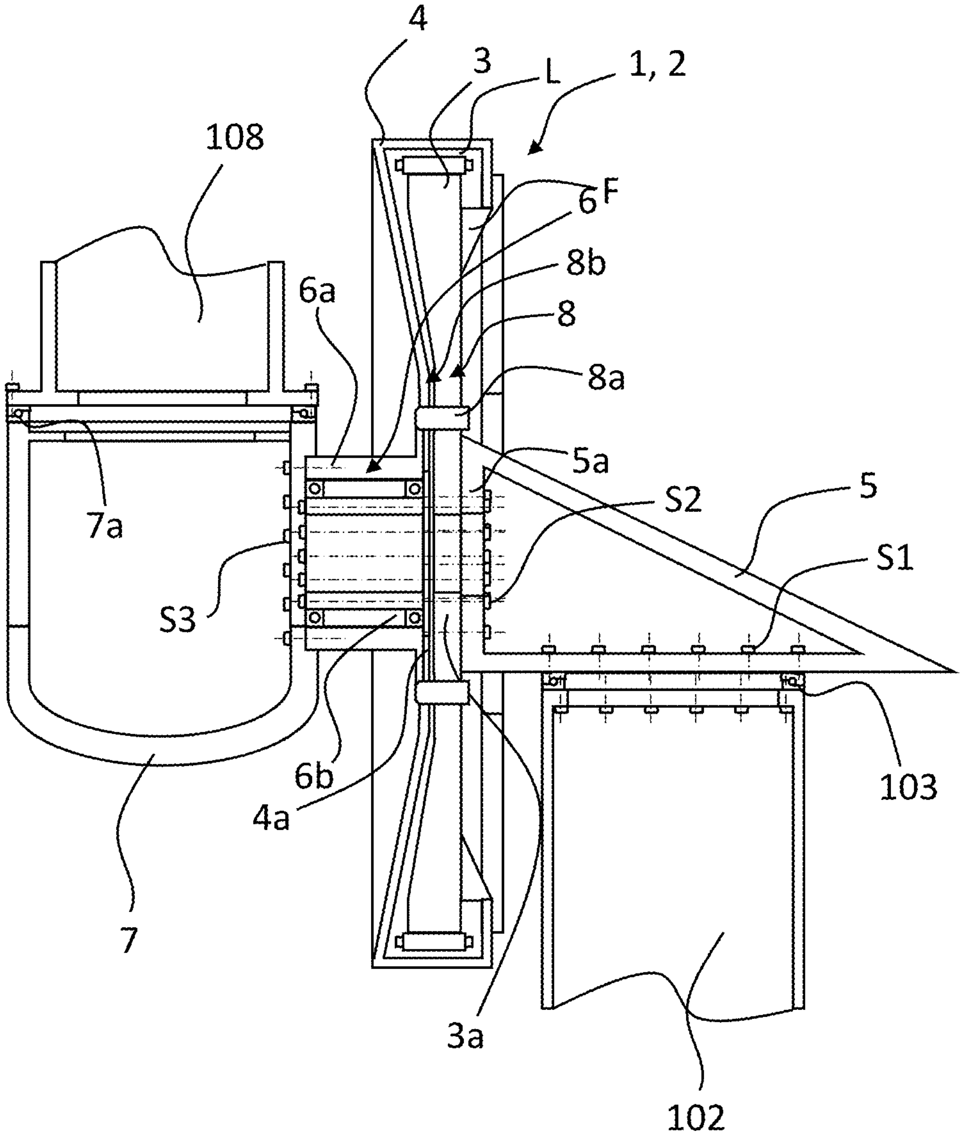
FIG. 11: a schematic sectional view of a wind turbine to be mounted in a third intermediate mounting state.

It is to be understood that the turning of the hub in the various mounting positions is done with the help of a main crane. Up to this point and also during the mounting of the rotor blades, the rotor carrier 6*a* is not bolted to the rotor flange 4*a* or connected in any other way. Until then, it is also provided that the rotor segment and the stator segment are connected to each other in a rotationally fixed manner by means of the flange F and a screw connection not shown. This is shown in FIG. 11.

Figure 12:
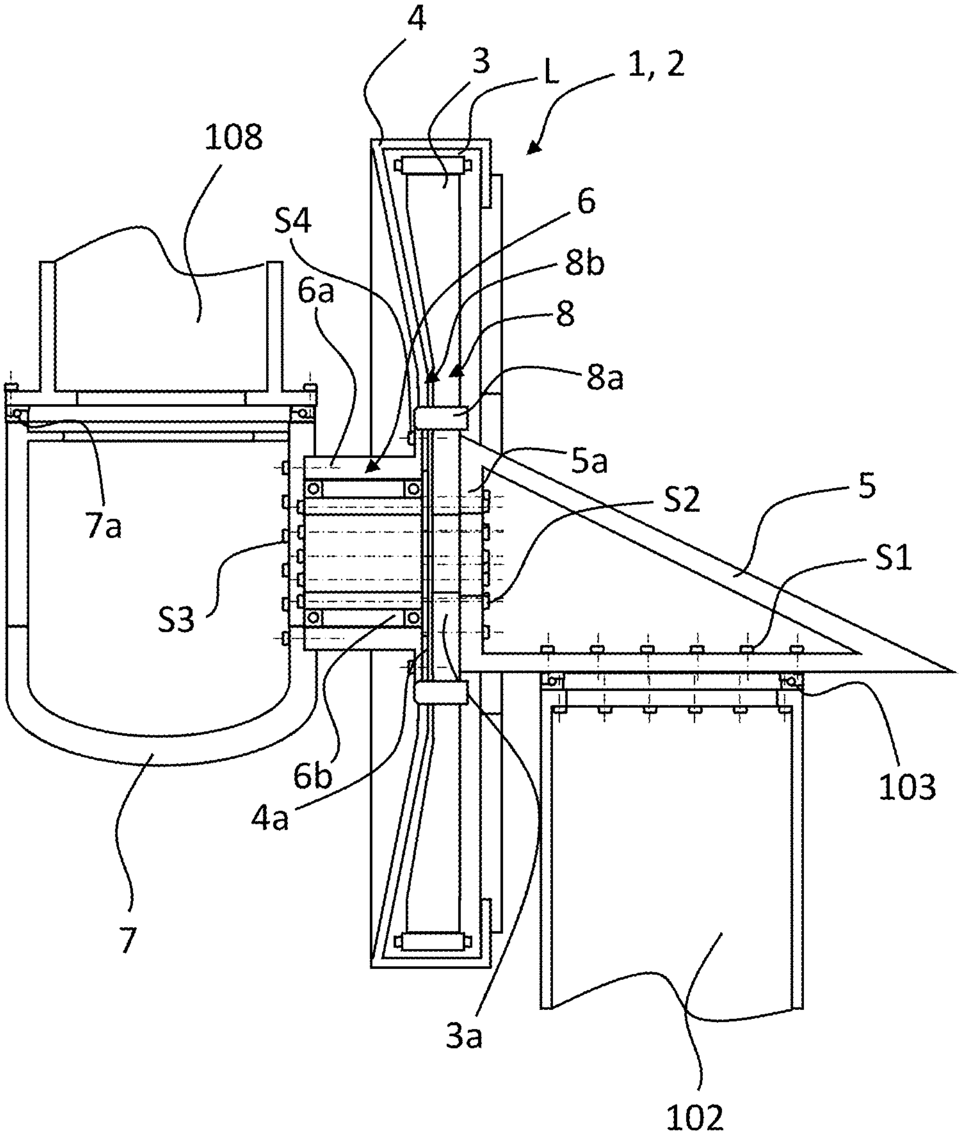
FIG. 12: a schematic sectional view of a wind turbine to be mounted in a completed mounting state.

Furthermore, in order to operate the wind turbine, it is necessary to release the stator segment from the rotor segment so that the rotor can rotate relative to the stator. In the present embodiments, the flange with the screw connection is to be released and the rotor carrier 6*a* is to be connected to the rotor flange 4*a*. This can be done by means of a screw connection S4, as shown in FIG. 12. This step is necessary when the stator segment is connected to the rotor segment.

Finally, the pre-fixed generator segments and the pre-fixed machine carrier on the tower must be fastened for the operation of the wind turbine.

It is advantageous if the rotor carrier can be fastened to the rotor flange and the pre-fixed generator segments and the pre-fixed machine carrier on the tower without the aid of a crane. In one example, the crane used to lift the machine carrier, the generator segments, the main bearing and the hub, and the rotor blades can be demounted and moved to another location while the rotor carrier is being fastened to the rotor flange, the pre-fixed generator segments and the machine carrier pre-fixed to the tower.

LIST OF REFERENCE SIGNS

1 Segmented generator
2 Generator segment
3 Stator segment
3*a* Stator flange
4 Rotor segment
4*a* Rotor flange
5 Machine carrier
5*a* Machine carrier flange
6 Main bearing
6*a* Rotor carrier
6*b* Axle journal
7 Hub
7*a* Rotor blade bearing
8 Locking device
8*a* Locking bolt
8*b* Locking receiver
100 Wind turbine
102 Tower
103 Tower bearing
104 Nacelle
105 Machine carrier
106 Rotor
108 Rotor blade
109 Rotor blade roots
110 Spinner
U Circumferential direction

What is claimed is:

1. A method for mounting a segmented generator of a wind turbine, wherein the segmented generator for operation of the wind turbine is formed from two or more generator segments, wherein the generator segments each have a stator segment and a rotor segment, wherein the stator segment for fastening the stator segment to a machine carrier flange of a machine carrier has a stator flange and the rotor segment for fastening to a rotor carrier of a main bearing has a rotor flange, wherein the two or more generator segments, in a circumferential direction (U), each extend between two connection interfaces (V1, V2) which are formed for connection with corresponding connection interfaces (V1, V2) of adjacent generator segments arranged in the circumferential direction (U), the method comprising:

providing a tower the wind turbine in an installation state, providing the machine carrier; and lifting and positioning of the machine carrier at an upper end of the tower, such that the machine carrier can be rotatably coupled to the tower via a tower bearing, pre-fixing the machine carrier to the tower for mounting purposes, such that the machine carrier is rotatably mounted with respect to the tower via the tower bearing, providing two or more generator segments in a transport position, wherein the stator segment and the rotor segment of the respective generator segment are connected to one another, lifting and positioning one of the two or more provided generator segments from the transport position to a mounting position in which the stator flange is arranged on the machine carrier flange, pre-fixing the generator segment for mounting purposes via the stator flange on the machine carrier flange in the mounting position, lifting and positioning at least one additional one of the two or more generator segments from the transport position into a further mounting position on the machine carrier flange of the machine carrier such that the pre-fixed generator segment is connectable to the generator segment positioned in the further mounting position via the connection interfaces of the respective generator segments, pre-fixing the further generator segment for mounting purposes in the further mounting position via at least one of:

the stator flange to the machine carrier flange or at the pre-fixed generator segment via the connection interfaces of the respective generator segments, whereby the lifting, positioning and pre-fixing with further of the two or more generator segments are repeated until the lifted, positioned and fixed generator segments form the segmented generator, providing the main bearing and a hub fastened to the main bearing in the transport position, wherein three rotor blade bearings are preferably provided on the hub, wherein the main bearing includes the rotor carrier and an axle journal, wherein the rotor carrier for the operation of the segmented generator is rotatably mounted relative to the axle journal, lifting and positioning of the main bearing such that the stator flange of the stator segment is arranged between the machine carrier flange and the axle journal, and fastening the axle flange to the machine carrier flange for the operation of the wind turbine, wherein the stator flange of the stator segment is arranged between the machine carrier flange and the axle journal, wherein the rotor carrier for mounting rotor blades on the hub is not yet or will not yet be connected to the respective rotor segments of the generator segments.

2. The method according to claim 1, further comprising:

providing a first rotor blade, lifting and positioning the first rotor blade at a first rotor blade bearing of the three rotor blade bearings, and fastening the first rotor blade to the first rotor blade bearing, wherein the first rotor blade bearing is provided in a 4 o'clock position or in an 8 o'clock position such that a connection of the first rotor blade to the first rotor blade bearing is made in the 4 o'clock position or in the 8 o'clock position.

3. The method according to claim 2, further comprising:

providing a second rotor blade, lifting and positioning the second rotor blade on a second rotor blade bearing of the three rotor blade bearings, and fastening the second rotor blade to the second rotor blade bearing, wherein the second rotor blade bearing is provided in a 4 o'clock position or in an 8 o'clock position, so that a connection of the second rotor blade to the second rotor blade bearing is made in the 4 o'clock position or in the 8 o'clock position.

4. The method according to claim 3, further comprising:

providing a third rotor blade, rotating the hub with the two fastened rotor blades such that one of the two rotor blades is aligned in a 10 o'clock position and the other of the two rotor blades is aligned in a 6 o'clock position, lifting and positioning the third rotor blade on a third rotor blade bearing of the three rotor blade bearings, and fastening the third rotor blade to the third rotor blade bearing, wherein the third rotor blade bearing is provided in a 2 o'clock position or in a 10 o'clock position such that a connection of the third rotor blade to the third rotor blade bearing is made in the 2 o'clock position or in the 10 o'clock position.

5. The method according to claim 4, wherein the stator segment of at least one generator segment, in a region of the stator flange, has a locking device and the rotor carrier of the main bearing has a locking receiver, in which the locking device engages in order to prevent a rotational movement of the rotor carrier and the hub with respect to the stator segment or the machine carrier, respectively, during the mounting of one of the rotor blades in a mounting position, and releases to allow a rotational movement of the rotor carrier and the hub with respect to the stator segment or the machine carrier, respectively, into a mounting position for the mounting of one of the rotor blades, and the method further comprises:

locking the rotor carrier of the main bearing to at least one of the stator segment or the machine carrier before mounting the first rotor blade on the hub, releasing the lock after mounting the first two rotor blades on the hub, rotating the hub with the two mounted rotor blades before mounting the third rotor blade such that one of the two mounted rotor blades is aligned in a 6 o'clock position and the other of the two rotor blades is aligned in a 10 o'clock position or in a 2 o'clock position, locking the rotor carrier of the main bearing to at least one of the stator segment or the machine carrier before mounting the third rotor blade on the hub, and mounting the third rotor blade on the hub.

6. The method according to claim 5, wherein the locking device comprises at least one displaceable locking bolt and the locking receiver on the rotor carrier forms at least one bolt receiver opening corresponding to the locking bolt, wherein at least one of:

the locking includes a displacing of the at least one locking bolt into the corresponding bolt receiver opening, or the releasing includes a displacing of the at least one locking bolt out of the corresponding bolt receiver opening.

7. The method according to claim 1, further comprising:

connecting the rotor carrier to the respective rotor segments of the generator segments, and releasing the stator segment from the rotor segment so that the rotor is rotatable with respect to the stator.

8. The method according to claim 1, wherein the generator segments in the circumferential direction each extend between two connection interfaces, and the method further comprises:

preparing the connection interfaces of the generator segments for the mounting of adjacently arranged generator segments, and fastening the connection interfaces of the adjacently arranged generator segments.

9. The method according to claim 1, further comprising at least one of:

fastening the pre-fixed generator segments for operating the wind turbine, after mounting the rotor blades or without a crane, or fastening the pre-fixed machine carrier to the tower for operating the wind turbine, after mounting the rotor blades or without the crane.

10. The method according to claim 9, further comprising:

fastening the rotor carrier to the rotor segments of the generator segments after the rotor blades have been fastened to the hub, without the crane.

11. A generator segment for a segmented generator of a wind turbine, comprising:

a stator segment, wherein the stator segment is configured to fasten the stator segment to a machine carrier flange of a machine carrier and has a stator flange, and a rotor segment, that has rotor flange configured to fasten to a rotor carrier of a main bearing, wherein the generator segment in a circumferential direction (U) extends between two connection interfaces which are formed to be connected to connection interfaces of generator segments arranged adjacent in the circumferential direction, the stator segment is configured to be coupled to the rotor segment via a locking device for mounting purposes, wherein the locking device is provided in a region of the rotor flange and the stator flange such that the rotor segment and the stator segment have, in the region of the rotor flange and the stator flange, at least one locking receiver formed as a bolt receiver opening, through which a locking bolt for locking the rotor segment to the stator segment is configured to be inserted from a release position such that the locking device takes a locking position, wherein the locking bolt is configured to be removed from the locking receiver for operation of the segmented generator, so that the locking device takes a release position, and the stator flange has fastening connections configured to pre-fix the generator segment to the machine carrier flange for mounting purposes and has fastening connections configured to fasten the generator segment to the machine carrier flange for the operation of the wind turbine.

12. The generator segment of claim 11, wherein the segmented generator comprises two or more generator segments.

13. The generator segment of claim 12, wherein the wind turbine comprises at least one of the generator segment or the segmented generator.

* * * * *